Feb. 18, 1930.  C. J. BURKLEY ET AL  1,747,856
ENDLESS BELT AND METHOD OF MAKING IT
Filed Oct. 20, 1928  2 Sheets-Sheet 1
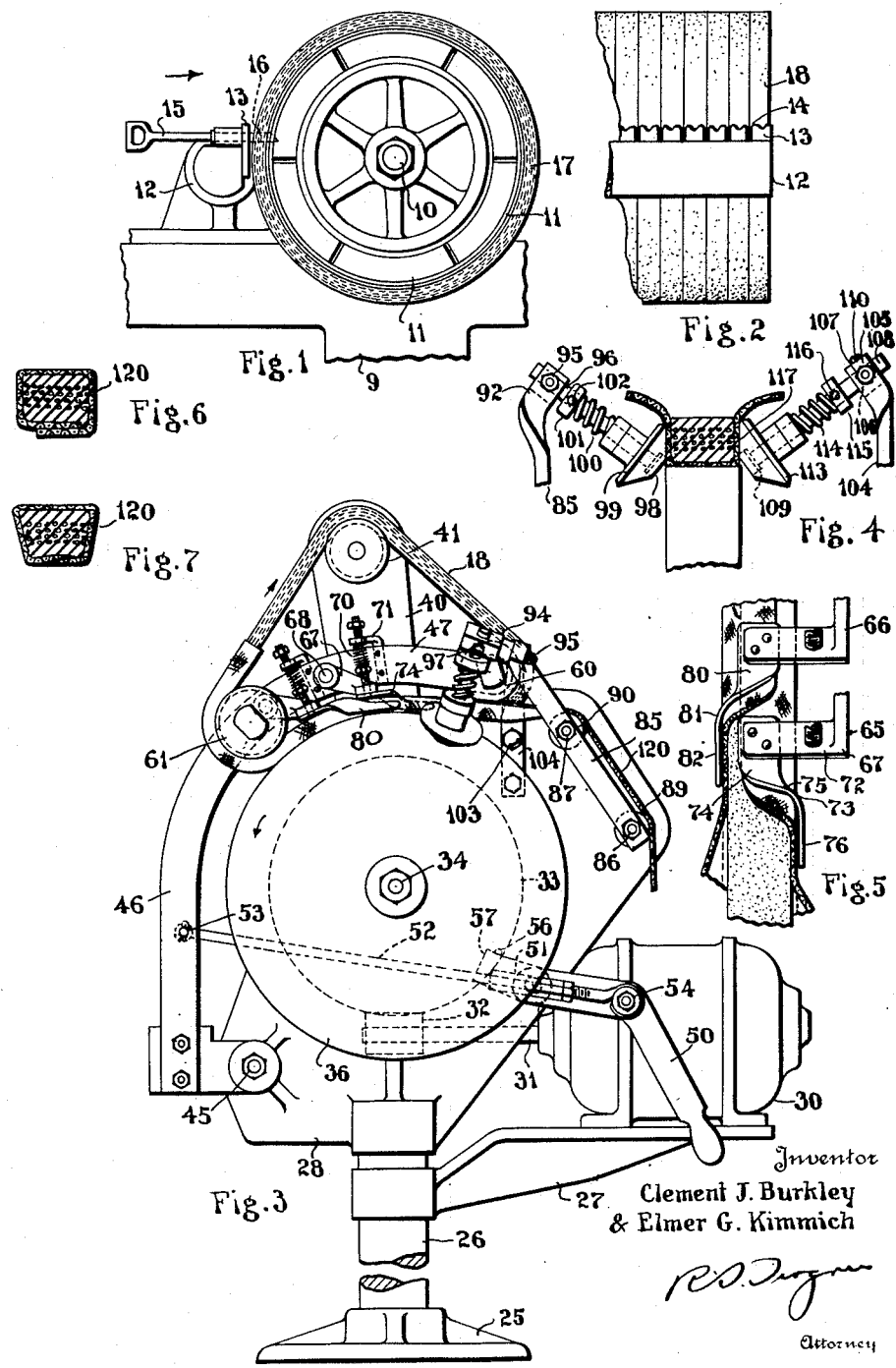
Inventor
Clement J. Burkley
& Elmer G. Kimmich
Attorney Feb. 18, 1930.  C. J. BURKLEY ET AL  1,747,856
ENDLESS BELT AND METHOD OF MAKING IT
Filed Oct. 20, 1928  2 Sheets-Sheet 2
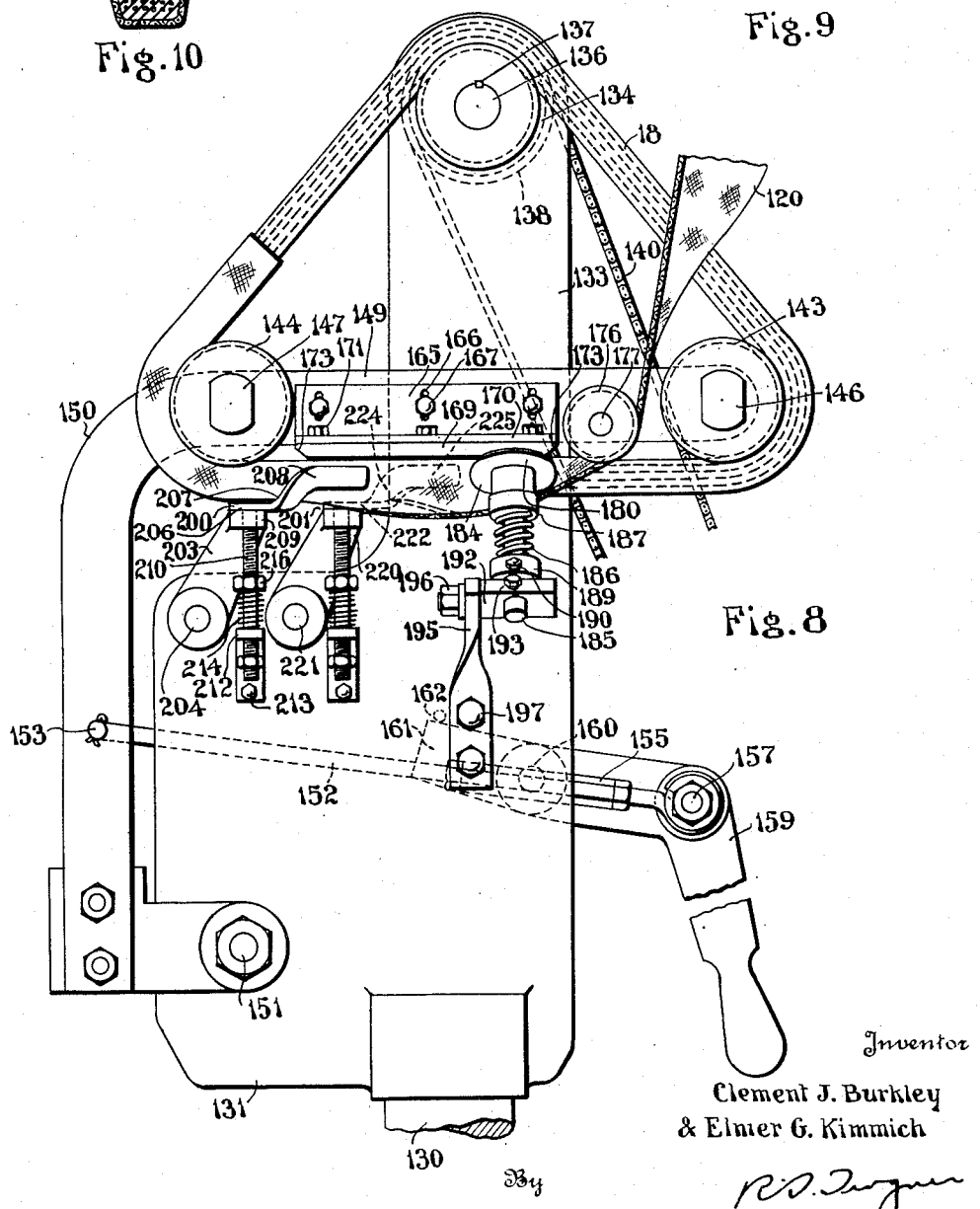
Inventor
Clement J. Burkley
& Elmer G. Kimmich Patented Feb. 18, 1930

1,747,856

UNITED STATES PATENT OFFICE

CLEMENT J. BURKLEY AND ELMER G. KIMMICH, OF AKRON, OHIO, ASSIGNORS TO THE GOODYEAR TIRE & RUBBER COMPANY, OF AKRON, OHIO, A CORPORATION OF OHIO

ENDLESS BELT AND METHOD OF MAKING IT

Application filed October 20, 1928. Serial No. 313,838.

This invention relates, generally, to laminated endless articles and it has particular relation to a method of making improved trapezoidal cross-sectioned or so-called V-type belts.

An object of the invention is to provide a novel and inexpensive method of and apparatus for applying a cover to the core of an endless belt.

Another object of the invention is to provide a belt of an improved construction.

According to this embodiment of the invention, a belt core is formed initially by winding vulcanizable material about a drum and subsequently cutting a band thus formed into cores or strips. Thereafter, a cover is applied to each core by circumferentially winding a strip of covering material about the core, and simultaneously folding its edge portions upon the outer or inner peripheral surfaces of the core in enveloping relation thereto. Following the application of the cover, the assembled unit is placed in a mold having a V-shaped cavity, wherein it is formed and vulcanized.

For a better understanding of the invention, reference may now be had to the accompanying drawings, forming a part of the specification, of which:

Fig. 1 is a fragmentary elevational view of a mechanism employed in forming the core of a belt constructed according to one form which the invention may assume;

Fig. 2 is a fragmentary elevational view, taken in the direction indicated by the arrow in Fig. 1;

Fig. 3 is an elevational view of a mechanism for applying a cover to the core of a belt;

Fig. 4 is an elevational view, on a larger scale, of the stitching rollers embodied in the mechanism shown by Fig. 3;

Fig. 5 is a plan view, also on a larger scale, of the device employed in folding the edge portions of the cover about the core;

Fig. 6 is a cross-sectional view of the assembled belt prior to its vulcanization;

Fig. 7 is a cross-sectional view of the belt subsequent to the vulcanizing operation;

Fig. 8 is an elevational view of a machine for flipping a cover on a core of a belt in such manner that the seams are disposed on the outer periphery thereof;

Fig. 9 is a cross-sectional view of a belt after a cover has been applied by the machine shown by Fig. 8; and Fig. 10 is a cross-sectional view of the belt shown by Fig. 9, after vulcanization thereof.

In practicing the invention, a driven shaft 10, operatively journaled on a base 9, supports a collapsible drum 11 which is keyed to the shaft for rotation therewith. At one side of the drum, the base 9 has a mounting 12 fastened thereon in parallel relation to the shaft 10, and upon which is secured a bar 13 having a plurality of grooves 14 therein that extend in a direction normal to the shaft 10. A knife 15, having a blade 16, is adapted to be projected selectively through the slots 14, and against the drum 11.

In the operation of the above described mechanism, strips of rubberized fabric and rubber alternately are wound upon the drum 11 until a band 17 of desired thickness is formed thereon. Thereafter, the band is cut into narrow annuli or cores 18 by moving the blade 16 selectively through the slots 14 into operative engagement with the band. Following this operation, the drum 11 is collapsed, and the cores 18 are removed therefrom.

The machine (Figs. 3, 4 and 5) for applying the outer covering to the cores thus formed includes a base 25 provided with a vertically projecting column 26 which, adjacent its upper end, supports a laterally extending bracket 27, and a vertically disposed frame plate 28. A motor 30, mounted on the bracket 27, has a shaft 31, upon which a worm 32 is secured. The worm meshes with a worm wheel 33, rigidly secured on one end of a shaft 34, which is journaled centrally of the plate 28. The opposite end of the shaft 34 beyond the plate 28 supports a relatively large disc 36. A vertically disposed arm 40, secured at its lower end against the surface of the plate 28, adjacent the wheel 33, is provided at its upper end with a roller 41 which is rotatably mounted thereon in the vertical plane of the disc 36.

An arm 46, pivoted at 45 to the plate 28 adjacent the upper end of the column 26, is provided with an upper arcuately formed portion 47 having a curvature slightly greater than that of the outer periphery of the disc 36. This arm is adapted to be moved about its pivot 45 by a rod 52 which is connected at opposite ends, respectively, by a pin 53 and a bolt 54, to intermediate portions of the arm 46 and an operating lever 50. A bolt 51, disposed substantially in alignment with the pin 53 and bolt 54, when the arm 46 is operatively positioned with respect to the disc 36, pivotally secures one end of the lever 50 to the plate 28. When the rod 52 is positioned slightly below the bolt 51, the end 57 of the lever 50 extended beyond the bolt 51 engages a pin 56 which projects normally from the surface of the plate 28. The arm 46 is prevented positively from further separational movement relative to the disc 36. However, when the lever 50 is rotated in a counter-clockwise direction upon the bolt 51, the distance between the upper end of the arm 46 and the disc 37 increases proportionally.

The arcuate portion 47 of the arm 46 is provided with a spaced pair of rollers 60 and 61, which are disposed in the vertical plane of the roller 41 and the disc 36. The arcuate portion of the arm 46 also supports a pair of folding devices 65 and 66. The folding device 65 comprises an angle bracket 67 pivoted at 68 to the arm 46 adjacent the roller 60, while an intermediate portion thereof is secured by a resilient connection 70 to a bracket 71 which also is mounted upon the arm 46. A folding element 73, rigidly secured at one end to the outer end of a laterally projecting portion 72 of the bracket 67, comprises a flat portion 74 extending toward the roller 60, which is twisted intermediate its ends to provide an arcuate portion 75 and a finger 76, the latter of which is disposed in a vertical plane at the inner side of the disc. The folding device 66 is located adjacent the roller 61 and is similar to the folding device 65, except that a folding element 80 thereof has a twisted arcuate portion 81 which is directed oppositely to the arcuate portion 75. A finger 82, which is embodied in the folding element 80, likewise projects in a vertical plane along the opposite side of the disc 36.

At the side of the plate 28 opposite the arm 46 is a bracket 85, secured in spaced relation thereto by bolts 86 and 87 projecting through the bracket and rotatably supporting a pair of sleeves 89 and 90, respectively. At its upper end, the bracket 85 is provided with an offset portion 92 (Fig. 4), in which a bolt 94, having a square and apertured head, is secured by a nut 95. A pin 96, secured by a set screw 97, is disposed in the aperture within the head of the bolt 94 at an angle to the vertical, and at its lower end rotatably supports a stitching roller 99 of conical shape, which is retained thereon by a head 98, integral with the lower end of the pin. The roller is resiliently maintained against the head 98 by a spring 100, which abuts at its upper end a collar 101 secured to the pin by a set screw 102, and at its lower end the aforesaid roller.

A second bracket 104 is secured directly to the plate 28 on the side of the disc 36 opposite the bracket 85, by bolts 103. Like the bracket 85, the bracket 104 has an offset portion 105, in which a square-headed bolt 106 is secured by a nut 107. A pin 108 inclined oppositely to the pin 85 and having a head 109 at its lower end, is secured to the bolt 105 by a set screw 110. A stitching roller 113 is rotatably supported on the lower end of the pin 108 against the head 109 by a spring 114, which abuts at its ends a collar 115 secured to the pin by a set screw 116 and the roller, respectively.

In applying a cover to a core 18 of a belt by the above described mechanism, the arm 46 is first released from its position shown by Fig. 3, by moving the lever 50 in a counter-clockwise direction, as previously described. When the arm 46 is in released position, the rollers 60 and 61 are spaced a substantial distance from the roller 41, thus permitting a core 18 to be trained over the rollers 41, 60 and 61. Thereafter, the arm 46 is moved to its operative position, in which the core is disposed against the disc 36, between the conical rollers 99 and 113 and between the fingers 76 and 82 of the folding devices 65 and 66, respectively. A strip of covering fabric 120, preferably so cut that its warp and woof cords are disposed at an angle to its length, now is trained over the sleeves 89 and 90, and at its upper end is stitched manually at one point to the outer periphery of the core. Energization of the motor 30 rotates the disc 36, and thereby moves the core 18 about the rollers 41, 60 and 61, which draws the cover 120 about its outer periphery. The sides of the cover are stitched against the sides of the core by the conical rollers 99 and 113, in a manner clearly shown by Fig. 4. Thereafter, the fingers 76 and 82, and the arcuate twisted portions 75 and 81 of the folding devices, guide the edge portions of the lower cover in enveloping relation about the inner periphery of the core. Since the cover is composed of rubberized fabric, when it is once pressed against the sides and peripheries of the core, it readily adheres thereto.

After the cover is applied, the arm 46 is released and the covered core removed. In order to form the belt to trapezoidal cross-section, it is disposed in a mold having a trapezoidal cavity and vulcanized therein under sufficient pressure to cause the belt to assume this form. Figs. 6 and 7 show the belt before and after vulcanization.

According to Fig. 8, a mechanism is provided for flipping the cover of the core of a belt in such manner that the seams thereof are disposed on the outer periphery of the belt instead of upon the inner periphery thereof. This machine is composed of a column 130 supported on a base (not shown) similar to the base 25 shown by Fig. 3, which column, in turn, at its upper end supports a vertically extending frame plate 131. The latter, at its upper end and at one side thereof, has a vertically projecting portion 133 of lesser width than the lower portion of the plate, at the upper end of which a shaft 136 is journaled. This shaft projects on opposite sides of the portion 133 and a grooved pulley 134 is secured thereto at one end by a key 137, whereas a sprocket 138 is secured at the opposite end thereof. The latter is operatively engaged by a chain 140, which, in turn, is driven by any suitable means (not shown), such as a motor having a sprocket secured to its shaft.

One of the belt cores 18 is disposed about the pulley 134, and about a pair of spaced pulleys 143 and 144, which are rotatably supported on stud bolts 146 and 147, threaded into a horizontally disposed arm 149. The latter arm adjacent the roller 144, has a vertically and downwardly extending part 150, that is pivoted, as indicated at 151, to the lower part of the frame plate 131. In order to move the part 150 about the pivot 151, it is pivotally connected, as indicated at 153, to a rod 152, which, in turn, is secured by an adjustable coupling 155 to a pin 157, extending outwardly from a hand lever 159. The latter is pivoted to the frame plate 131, as indicated at 160, and beyond the pivot has a portion 161, adapted to abut a pin 162, also mounted on the frame plate, for limiting the movement of the hand lever and the arm 150 in a clockwise direction. Owing to the fact that the rod 152 and the pivots 153, 160 and 157 are in substantial alignment when the arm 150 is in its operative position, the latter is maintained securely in this position.

The horizontal arm 149 has an angle plate 165 between the rollers 143 and 144, and adjacent the latter which is adjustably secured thereto by bolts 167 projecting through vertically extending elongate slots 166. A portion 170 of the angle plate extends perpendicularly to the plane in which the rollers 143 and 144 rotate and has a block 169 secured by bolts 171 to its lower surface. This block is disposed in the plane in which the rollers 143 and 144 rotate, and its lower surface is adapted to be engaged slidably by the aforesaid core 18 of the belt. In order to facilitate movement of the core past the block, the ends of the latter are curved as indicated at 173. Another flanged roller 176 is pivotally secured by a stud bolt 177 to the arm 149 between the angle plate 165 and the roller 143 and this roller also is disposed in the plane of the rollers 143 and 144.

Roller mechanisms 180, disposed below the block 169 adjacent the roller 176, are provided for stitching the sides of the cover to the sides of the core 18 of the belt. There are two of these mechanisms secured in spaced relation like the stitching mechanisms shown by Fig. 4, but disposed at an opposite inclination. Each of the mechanisms comprises a conically faced roller 184 rotatably mounted on a pin 185 which has a head at its upper end similar to the head 109, shown by Fig. 4 for maintaining the roller thereon. The lower end of the pin is secured by a set screw 193 in a block 192 and the block, in turn, is bolted, as indicated at 196, to a twisted bar 195 which has its lower portion fastened by bolts 197 to the frame plate 131. The roller is resiliently retained in its upper position by a spring 186 which abuts a thrust bearing 187 at its upper end that, in turn, abuts the roller 184, and at its lower end a collar 189 secured by a set screw 190 to the pin 185.

Folding devices 200 and 201, disposed beneath the pulley 144 and the block 169 are provided for guiding the edge portions of the cover over the outer periphery of the belt following the stitching operation. The folding element 200 is secured to the upper end of an arm 203 pivotally mounted on a stud shaft 204, engaged with the frame plate 131, and is composed of a horizontal plate portion 206, twisted intermediate its ends to provide an arcuate portion 207 and a finger 208, the latter of which is disposed in a vertical plane substantially coinciding with the outer flanges of the pulleys 143 and 144. A lug 209, secured on the lower side of the folding element 200, is engaged by a threaded rod 210, which loosely projects through a bracket 212, bolted, as indicated at 213, to the frame plate 131. A spring 214, encircling the rod 210 between the lug 209 and the bracket, abuts at its upper end a nut 216 threaded on the rod, and at its lower end the bracket.

Similarly, the folding element 201 is secured to the upper end of an arm 220, which is pivoted, as indicated at 221, to the frame plate 131, and comprises a flat plate 222, which is twisted intermediate its ends oppositely to that of the plate 206, to provide an arcuate portion 224 and a finger 225, which is disposed parallel to the finger 209 and in the plane of the other flanges of the rollers 143 and 144.

In operation, a core 18, disposed about the rollers 134, 143 and 144, is driven thereover by the chain 140, which engages the sprocket 138 and thus transmits a driving force to the pulley 134. An elongate strip of covering material 120 is directed from a position at one side of the core 18 into the plane of such core inwardly of its inner periphery under the roller 176, and between the core 18 and the block 169. As the core and cover move past the lower surface of the block 169, the conical rollers 180, disposed on either side of the core, stitch the cover against the sides of the latter, following which operation, the folding devices 201 and 200, respectively, fold the edge portions of the cover about the outer periphery thereof and, by reason of the resiliency with which they are urged upwardly, firmly press the edges of such cover into overlapping relation.

One or more thicknesses of cover may be applied to the core of the belt continuing the operation until this is accomplished. After the cover is applied, the arm 149 is released, whereafter the belt is removed by operation of the hand lever 159. As now assembled, the belt has a rectangular cross-sectional formation, indicated by Fig. 9. Thereafter, it is placed in a mold having a trapezoidal cavity and vulcanized, whereafter its cross-sectional formation is such as shown by Fig. 10.

It is to be understood that, while two mechanisms have been provided for disposing the edges of the cover about the inner and outer peripheries, respectively, the method of applying the cover is not limited specifically thereto. For example, the mechanisms may be so modified that the edges of the cover will be disposed on either side of the core, instead of on a periphery thereof. This may be accomplished readily by mounting the angle bracket 165, roller 176, the stitching rollers 180, and the folding devices 200 and 201 in positions 90° removed from the present positions, considering the horizontal portion of the core as an axis.

From the foregoing description, it is apparent that the invention is embodied by a belt having materially improved construction features which greatly facilitate its practical and efficient operation. Furthermore, it is apparent that the novel method employed in constructing the belt is readily adaptable for the production of such articles of manufacture on a large scale. By employing a cover folding mechanism comprising one unit of the apparatus for practicing the method, only a relatively short time is required in applying the cover to the core of the belt and, consequently, the expense of this part of the manufacturing operation is reduced proportionally.

Although we have illustrated more than one form which the invention may assume and have described those forms in detail, it will be apparent to those skilled in the art that the invention is not so limited but that various modifications may be made therein without departing from the spirit of the invention or from the scope of the appended claims.

What we claim is:

1. A method of making endless belts which comprises forming an annular core of vulcanizable material, supporting the core upon means engaging it at peripherally spaced points, moving the core about such points, applying a woven fabric cover to the core as it is moved, by applying an elongate strip of such fabric to one surface of the core and folding the edges of the strip laterally about the core, and finally vulcanizing the assembly.

2. A method of making endless V belts which comprises forming an annular core of vulcanizable material substantially rectangular in cross-section, supporting the core upon means engaging it at peripherally spaced points, moving the core about such points, applying a woven fabric cover to the core as it is moved, by applying an elongate strip of such fabric to one surface of the core and folding the edges of the strip laterally about the core, and finally vulcanizing the assembly to V-shape.

3. A method of making endless V belts which comprises forming an annular core of vulcanizable material by winding cord fabric into a plurality of convolutions with the cords extending only circumferentially of the core, supporting the core upon spaced rotatable means, moving the core about said means, applying a woven fabric cover to the core by applying an elongate strip of such fabric to a surface of the core and folding the edges of the strip laterally about the core, and finally vulcanizing the assembly to V-shape.

4. A method of making endless belts which comprises forming an annular core of vulcanizable material, supporting the core upon means engaging it at peripherally spaced points, moving the core about such points, applying a woven fabric to the core as it is moved, by applying an elongate strip of such fabric to the outer peripheral surface of the core and folding the edges of the strip laterally about the core, and finally vulcanizing the assembly.

5. A method of making endless belts which comprises winding strips of rubberized fabric about a drum until a desired thickness is obtained, cutting the band thus formed into narrow annular cores of substantially rectangular cross-section, supporting each core by means engaging it at peripherally spaced points, moving the core about such points, applying a woven fabric cover to the core during its movement, by applying an elongate strip of such woven fabric to one surface of the core and folding the edges of the strip laterally about the core, and finally vulcanizing the assembly to desired cross-sectional contour.

6. A method of making endless V-belts which comprises winding strips of rubberized cord fabric about a drum until a desired thickness is obtained, with the cords in the fabric extending only circumferentially of the drum, cutting the band thus formed into narrow annular cores substantially rectangular in cross-section, supporting each core by means engaging it at peripherally spaced points, moving the core about such points, applying a woven fabric cover to the core during its movement in which the threads of the fabric extend obliquely to the length of the strip, by applying an elongate strip of such woven fabric to one surface of the core and folding the edges of the strip laterally about the core, and finally vulcanizing the assembly to V-shape.

In witness whereof, we have hereunto signed our names.

Signed at Akron, in the county of Summit and State of Ohio, U. S. A., this 19th day of October, 1928.

CLEMENT J. BURKLEY.
ELMER G. KIMMICH.